(12) United States Patent
Bryman

(10) Patent No.: US 7,253,415 B2
(45) Date of Patent: Aug. 7, 2007

(54) METHOD AND APPARATUS FOR VETOING RANDOM COINCIDENCES IN POSITRON EMISSION TOMOGRAPHS

(75) Inventor: Douglas Bryman, Vancouver (CA)

(73) Assignee: Triumf, Vancouver (CA)

( * ) Notice: Subject to any disclaimer, the term of this patent is extended or adjusted under 35 U.S.C. 154(b) by 74 days.

(21) Appl. No.: 11/083,322

(22) Filed: Mar. 18, 2005

(65) Prior Publication Data

US 2005/0205791 A1    Sep. 22, 2005

Related U.S. Application Data

(60) Provisional application No. 60/554,347, filed on Mar. 19, 2004.

(51) Int. Cl.
*G01T 1/164* (2006.01)
(52) U.S. Cl. .................................. 250/363.03
(58) Field of Classification Search ............ 250/363.03
See application file for complete search history.

(56) References Cited

U.S. PATENT DOCUMENTS

| 5,821,541 | A | * | 10/1998 | Tumer | 250/370.09 |
|---|---|---|---|---|---|
| 6,100,532 | A | | 8/2000 | Bryman | |
| 6,294,788 | B1 | * | 9/2001 | Cooke et al. | 250/363.03 |
| 2004/0007670 | A1 | | 1/2004 | Bryman | |

FOREIGN PATENT DOCUMENTS

JP    57131086 A    *    8/1982

OTHER PUBLICATIONS

K. Masuda et al., "Test of a Dual-Type Gridded Ionization Chamber Using Liquid Xenon," Nuclear Instruments and Methods 174 (1980) pp. 439-446.

S. Adler et al., "Further Evidence for the Decay $K^+ \to \pi^+$," The American Physical Society, vol. 88, No. 4, Jan. 28, 2002, pp. 041803-1-041803-4.

K. Masuda et al., "Liquid Xenon Position Sensitive Gamma-Ray Detector for Positron Annihilation Experiments," Nuclear Instruments and Methods 188 (1981) pp. 629-638.

M.I. Lopes et al., "Positron Emission Tomography Instrumentation: Development of a Detector Based on Liquid Xenon," Proc. Calorimetry in High Energy Physics (1999), pp. 675-680.

* cited by examiner

*Primary Examiner*—Constantine Hannaher
(74) *Attorney, Agent, or Firm*—Harness, Dickey & Pierce

(57) ABSTRACT

An improved gamma ray detector and method for discriminating between "true" pairs of gamma rays produced by a single positron annihilation event and those randomly occurring "pairs" of gamma rays that may fall within the conventional acceptance criteria for "true" pairs. The gamma ray detector incorporates an additional array of "veto" detectors arranged adjacent or around a primary detector array. The array of "veto" detectors is configured to detect gamma rays that escape detection in the primary detector array. The detection data from both the primary detector array and the veto detector array are used as inputs into a discrimination circuit for "vetoing" those pairs of gamma rays detected by the primary detector array that are likely to be the result of two or more unrelated positron annihilation events. By increasing the proportion of "true" events used in image reconstruction, the apparatus and method may improve the quality of the resulting image, reduce the image processing time and/or reduce the need for subsequent data collection and/or manipulation.

20 Claims, 5 Drawing Sheets

METHOD AND APPARATUS FOR VETOING RANDOM COINCIDENCES IN POSITRON EMISSION TOMOGRAPHS

PRIORITY STATEMENT

This application claims priority under 35 U.S.C. § 119(e) to U.S. Provisional Patent Application No. 60/554,347, which was filed on Mar. 19, 2004, the contents of which is incorporated herein, in its entirety and for all purposes, by reference.

BACKGROUND OF THE INVENTION

Gamma ray detectors are used in a wide variety of apparatus, such as in positron emission tomograph (PET), single photon emission-computed tomograph (SPECT), explosive detectors, and the like. All of such apparatus depend upon, in part, detectors which can determine the position of interactions of gamma rays with the detectors, such that with a plurality of such position measurements, a scan of an object of interest can be made. These techniques are well known to those of skill in the art and will not, therefore, be further detailed herein.

The difficulty with all such detectors is that a large number of such detectors are necessary for accurate scanning, and the positions of interactions of gamma rays with the detectors must be determined with sufficient accuracy so that with the accumulation of, typically, millions of such determinations, sufficient data is obtained for producing an accurate image of the scanned object(s). Because each of the detectors must be capable of generating position data for a gamma ray interaction, acquisition of such position data and the compilation thereof, e.g. by a computer, may require very substantial and expensive apparatus.

Typically, the data from such detectors is initiated by a generation of light in a scintillator material produced within the detector as a gamma ray interacts in the detector. By determining the detector in which such light was emitted, and the position of that emitted light within the detector, a data point for a scan is produced. By providing a multiplicity of such detectors, which can number in the thousands depending upon the application, and each detector providing a multiplicity of data points, the compiled interaction data can be used to produce an image of the scanned object. In PET, two such detectors which fire simultaneously are used to create a line of response (LOR) used in constructing the image.

Typically, for example, photodetectors will be provided with an array of scintillating detectors where the photodetectors detect the emission of light in the scintillating detectors with a logic circuit being employed to determine the position of emitted light. However, as can be appreciated, the monitoring instrumentation, including the photodetectors, logic circuits and related controller and signal devices (referred to collectively as a read-out channel) can result in very complex monitoring instrumentation, especially when a large number of detectors are required to obtain the desired accuracy in the intended scan.

In addition, a conventional detector for such gamma ray scanning devices is an inorganic scintillating crystalline material, e.g. cerium doped lutetium oxyorthosilicate (LSO) and bismuth germinate (BGO), which is, in and of itself, expensive. The stimulated region of the scintillator material which will emit light and thereby allow the position of interaction with a gamma ray to be determined. The X-Y position resolution of such conventional detectors may be on the order of 20 mm$^2$ and doe not tend to be uniform for all positions.

This resolution and lack of uniformity results in a basic level of inaccuracy that precludes precise identification of exactly where in the detector, i.e. at which XY coordinates, that gamma ray interaction occurred. In addition, the depth of the interaction, i.e. the Z coordinate, is generally not determined, or is determined with reduced accuracy in comparison to the X and Y coordinates, resulting in a so-called parallax error and further reducing the accuracy of the resulting image.

A modular light signal triggerable gamma ray detector is disclosed in the Applicant's U.S. Pat. No. 6,100,532, which is hereby incorporated by reference in its entirety. The disclosed detector includes at least one module, and each module includes a converter for converting gamma rays into charged particles. A scintillator is provided for emitting light in response to the charged particles produced by the converter and an associated photodetector determines when light has been emitted from the scintillator. A two-coordinate position detector is provided for determining the X, Y and Z coordinates of charged particles interacting with the position detector. Finally, a controller and signal device are provided for signaling the presence of emitted light in the photodetectors and for activating the position detector to complete a system that addresses some of the deficiencies of conventional systems. The resulting gamma ray detector is generally less expensive to construct, reduces the amount of monitoring instrumentation necessary for acquiring the required data, and more accurately determines the X, Y and Z coordinates of the gamma ray interaction than conventional systems.

The conversion of gamma rays in material (including heavy liquids like xenon (Xe), krypton (Kr), and the like) and the production of scintillation light and charged products (electrons and positrons) are well studied and understood by those skilled in the art and will not, therefore, be discussed in detail herein. It is also noted that various software tools are available for simulating the interactions of gamma rays and charged particles with a range of matter. Position sensitive detectors for charged particles, such as noble liquid ionization chambers, time-projection-chambers (TPC), and light detection arrays are conventional instruments that are known to have position and energy resolution capability similar to the preferred detectors and may be suitable for use, singly or in combination, in the present apparatus and method.

Improved liquid Xe position sensitive ionization detectors with grids such as described by Masuda et al. in *A Liquid Xenon Position Sensitive Gamma-Ray Detector for Positron Annihilation Experiments*, Nucl. Instr. Meth. 188 (1981) 629-638; and *Test of a Dual-Type Gridded Ionization Chamber Using Liquid Zenon*, Nucl. Instr. Meth. 174 (1980) 439-446, the contents of which are hereby incorporated, in their entirely, by reference, can provide sub-millimeter position resolution for low energy gamma rays. Such detectors have been incorporated in gated time projection ionization chambers as reported by Columbia University that have achieved position resolution on the order of 1 mm and energy resolution on the order of 5.9% for 1 MeV gamma ray energy.

Others have constructed a liquid Xe ionization detector having a transaxial position resolution on the order of 1 mm, depth of interaction resolution of 5 mm, coincidence time resolution of 1.3 ns, energy resolution at 511 keV of 17% and efficiency of approximately 60% as reported be Lopes, et al., in *Positron Emission Tomography Instrumentation: Development of a Detector Based on Liquid Xenon*, Proc. Calorimetry in High Energy Physics, pages 675-680 (1999)), the contents of which is hereby incorporated, in its entirety, by reference.

Positron Emission Tomography (PET) is an important medical imaging modality in which pairs of gamma rays emitted when positrons annihilate are detected in coincidence. Data obtained from coincident detectors recorded within a time window characteristic of the specific apparatus employed are used to construct lines of response (LOR) from which images are developed using well known algorithms. Images are generally limited in resolution by several factors including range of positrons, detector spatial and energy resolutions, scattering of photons in the object/patient under investigation before the photons reach the detectors, and scattering in the detectors. In addition, random or accidental coincidences which occur when two or more photons from separate annihilation events are detected within the resolving time window of the apparatus limit the statistical precision of image reconstruction. Identification and/or suppression of data associated with random or accidental coincidences will, therefore, tend to improve the accuracy and image quality that can be obtained from a given detector system.

SUMMARY OF THE INVENTION

The present invention is a new method for reducing or substantially eliminating random coincidences in PET tomographs. FIGS. 1A and 1B show side and end view cross-sectional representations of a conventional PET spectrometer comprising a ring of photon detectors P arranged in a ring around a scanned object O. These photon detectors may be position sensitive scintillating crystal detectors associated with corresponding photo-sensitive devices or other gamma ray detectors such as liquid Xe detectors described above.

As illustrated in FIGS. 2A and 2B, an exemplary embodiment of a detector according to the invention employs additional gamma ray detectors designed to detect photons which are produced in random coincidences of unrelated annihilation events, but which escape the PET detectors. The additional detectors may partially surround the primary tomography ring with a "photon veto" detector assembly V, that can be used for improving the detection, identification and exclusion of random events from the primary detector data. FIGS. 2A-2B and 3A-3B illustrate two embodiments of PET spectrometers in which the primary tomography detector P array is augmented by an assembly of additional photon veto detectors V surrounding the spectrometer so that much of the full 4π steradians solid angle subtended by the object or patient is covered by either P and/or V detectors. In an alternate embodiment, only small solid angle coverage may be used for detectors V which is arranged to accommodate the geometry and rate of activity of the source.

FIGS. 2A-2B, for example, illustrate an exemplary PET system in which the primary tomograph is incompletely surrounded by the veto detector array and FIGS. 3A-3B illustrate an exemplary micro-PET arrangement in which the primary tomograph is substantially enclosed within the veto detector array. As will be appreciated, in both the exemplary embodiments illustrated in FIGS. 2A-2B and 3A-3B, the veto detector array preferably provides sufficient angular coverage so that the majority of those photons produced by randoms events in which one of the photons strikes one of the detectors P in the primary tomography array would be detected and registered in one of the veto detectors provided adjacent the primary detector array.

The positioning of the additional veto detectors will be selected to cover a portion of the solid angle surrounding the scanned object that is different from and/or provides additional coverage relative to that provided by the primary detectors. The positioning and coverage of the veto detectors is preferably selected to balance the advantages associated with detecting extra photons $ra_{1b}$, $r_{2a}$ associated with randoms events $r_1$, $r_2$ that may have contributed to the, detection of a "false positive" (resulting from the detection of photons $r_{1a}$ and $r_{2b}$ within a coincidence period) in the primary detector array and the disadvantages of "false vetoes" resulting from the detection in the veto detectors of one or more photons $r_{3a}$, $r_{3b}$ associated with randomly occurring events $r_3$ that did not or were unlikely to have contributed to the detection of a "false positive" in the primary detector array and occurred substantially simultaneously with a "true" event (event C in FIGS. 1A, 2A and 2B).

As will be appreciated by those skilled in the art, reducing the number of "false positives" counted by the primary detector array will improve the quality of the detection data and the precision and accuracy of the resulting generated image and reducing the number of "false vetoes" will reduce the loss of "true" event data and increase the rate at which image data that can be collected. A partial coverage example is shown in FIGS. 2A-2B wherein the veto detector array V extends from both sides of the primary detector array for detecting photons whose trajectory causes them to miss the primary detector array. Additional veto detector array configurations are illustrated in FIGS. 4A-4E.

The veto detector array V may be constructed from one or more types of photon detectors that have or may be configured to have the degree of timing resolution necessary to veto random events that occur within an appropriate coincidence window. Detectors suitable for use in the veto detector array include, for example, segmented crystals with individual photo-detectors, large single crystals, combinations of plastic scintillator and lead detectors, liquid xenon, and any other type of photon detector that exhibits sufficient sensitivity and timing resolution. In addition, since a typical random event in the tomograph involves two missing photons, it will sometimes be advantageous to limit the efficiency of detection (e.g., by limiting the detector's thickness) for the veto detectors so as to reduce the effects of false vetoing.

An electronic logic system is coupled to both the primary tomograph ring and the veto detector assembly for improving the ability of the imaging system to distinguish between "True" event photons, and accept the corresponding position data for inclusion in the accumulating image data, and random event photons, which are preferably excluded from the image data. An example of an electronic logic system to accomplish the veto function is shown schematically in FIG. 5.

BRIEF DESCRIPTION OF THE DRAWINGS

The invention will become more apparent by describing in detail exemplary embodiments thereof with reference to the attached drawings in which.

Figure 1A:
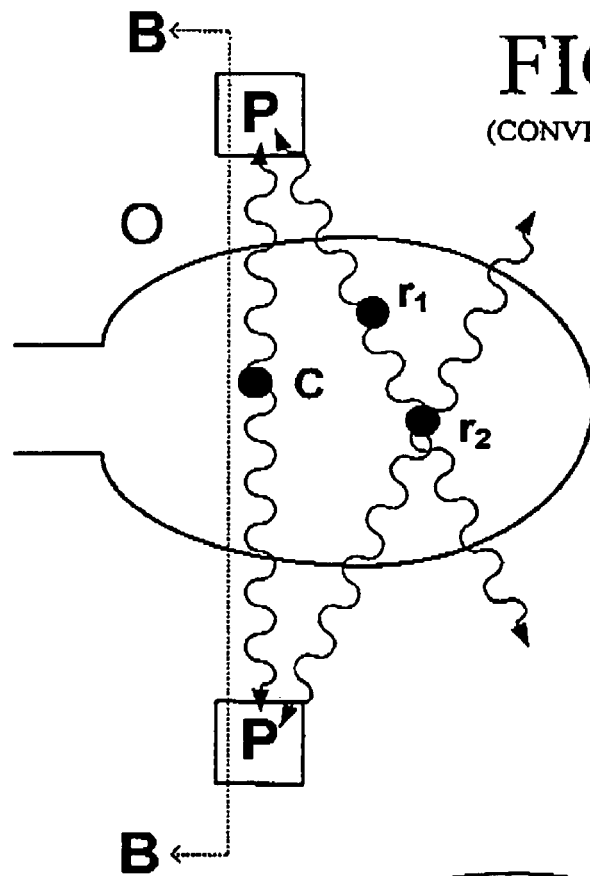
FIGS. 1A-1B illustrate cross-sectional side and end views of a conventional PET system. P represents the photon detectors in which coincident gamma rays from annihilation events such as the event labeled C are detected. Random events $r_1$ and $r_2$ each produce one gamma ray detected by P to form a false or accidental coincidence event.

These drawings have been provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity.

DESCRIPTION OF EXEMPLARY EMBODIMENTS

The present invention is directed to an apparatus and method for eliminating or severely reducing random coincidences in PET tomographs, thereby improving the accuracy and resolution of the tomographs. The system consists of gamma ray detectors which are arranged to detect photons not registered in the tomograph along with an electronic logic system that vetoes or eliminates from further consideration those events in which additional signals are detected. In this manner, events with random coincidences will not substantially reduce the statistical significance of the image data consisting of true coincidences. Exemplary gamma ray detectors and their operation are detailed in the inventor's U.S. Pat. No. 6,100,532, and in published U.S. Patent Appl. No.2004/0007670, the disclosures of both are hereby incorporated in their entirety by reference.

In conventional PET tomographs, signals from selected sets of detector element pairs are accepted if they occur within a specified coincidence time window τ. Each detector element is potentially paired with a subset (or fan) of other detector elements. The detector elements are typically arranged in a ring surrounding the patient or object being scanned. A coincidence of signals from the $i^{th}$ and $j^{th}$ detector in the ring, $P_i \cdot P_j$, within the allowed time window represents a single LOR. The data is often also qualified by energy information (e.g., threshold) for the signals from detectors i and j. A "True" event is caused by a single positron annihilation event which produced two photons that were detected nearly simultaneously and in which neither photon scattered before detection. True events occur in the detectors within a finite time interval due to the speed of light from the point of annihilation and due to the properties of the detector response. Scattered events also occur within the acceptance time window and must be identified by other means.

Random coincidences degrade the performance of the tomographs by introducing background noise into the data utilized by the image reconstruction algorithms. This background noise tends to degrade the quality of the reconstructed image and may reduce the diagnostic utility of the resulting images. The primary source of the random events occur when two unrelated annihilation events are detected in a manner that corresponds to a single event.

These random events are the result of a photon from a first annihilation event and a photon from a second and unrelated annihilation event being detected by a valid pair of detector elements within the coincidence time window of the tomograph. As long as the energies of the detected photons are within acceptable limits and they arrive at a valid pair of detectors within the coincidence time period, the photons from the unrelated events will be treated as if they were from a single event occurring at a position offset from either of the actual events. The detection of random events may be reduced somewhat by increasing the solid angle acceptance and sensitivity of the detector array so that fewer "events" actually representing photons from at least two unrelated events will be identified as "True" events.

The fraction of random events is routinely determined by sampling out of time events. The noise fraction from this source is determined and then it is subtracted, generally while operating either in sinogram mode or in list mode for data acquisition. While these techniques can be effective in reducing noise and improving the quality of the resulting images, they nevertheless reduce (often substantially) the statistical power of the true coincidence image data because the added random events in the signal sample reduce the statistical precision, and subtraction of the out of time sample further reduces the statistical precision. In addition, the system dead time is increased by collection of the randoms events and by the need to collect additional out of time data.

Other techniques including, for example, determining the randoms contribution from the rate of single hit events in each detector element are feasible and well known, but they also complicate the acquisition of true data because extra circuitry is required. Various analysis algorithms have been developed to minimize the effects of the randoms subtraction but the deleterious effects of false "Trues" or accidentals nevertheless in many cases limits the precision and quality of the subsequent image reconstruction from the collected data.

Figure 1B:
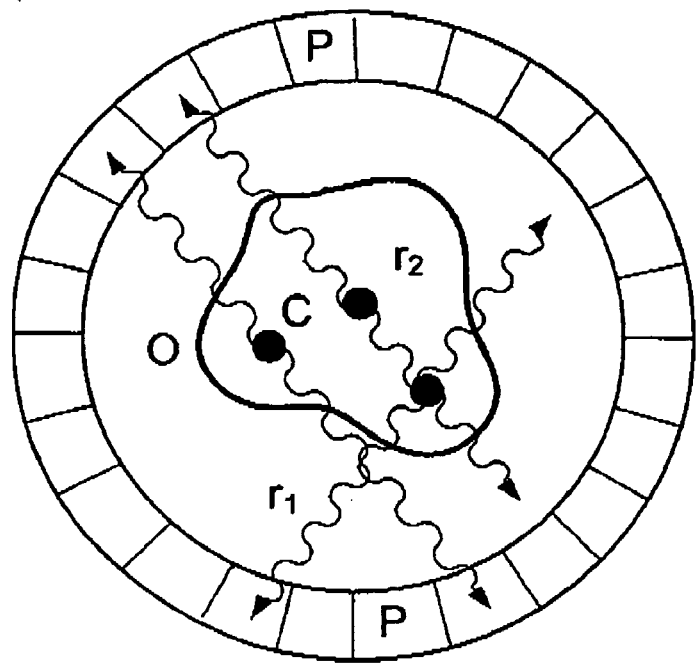

The present invention is a new method for eliminating or severely reducing random coincidences in PET tomographs. FIGS. 1A and 1B show side and end view cross-sectional representations of a conventional PET spectrometer comprising a ring of photon detectors P arranged in a ring around a scanned object O. These photon detectors may be position sensitive scintillating crystal detectors associated with corresponding photo-sensitive devices.

As shown in FIGS. 1A and 1B, a True coincidence event C is one in which the pair of photons detected by detectors P arranged on opposite sides of the tomograph ring are from a single positron annihilation. Also illustrated in FIGS 1A and 1B is a random event in which one photon from each of two separate annihilations $r_1$ and $r_2$ are detected in coincidence by opposed detectors on the tomograph ring while the second photons from the $r_1$ and $r_2$ events escape detection.

Figure 2A:
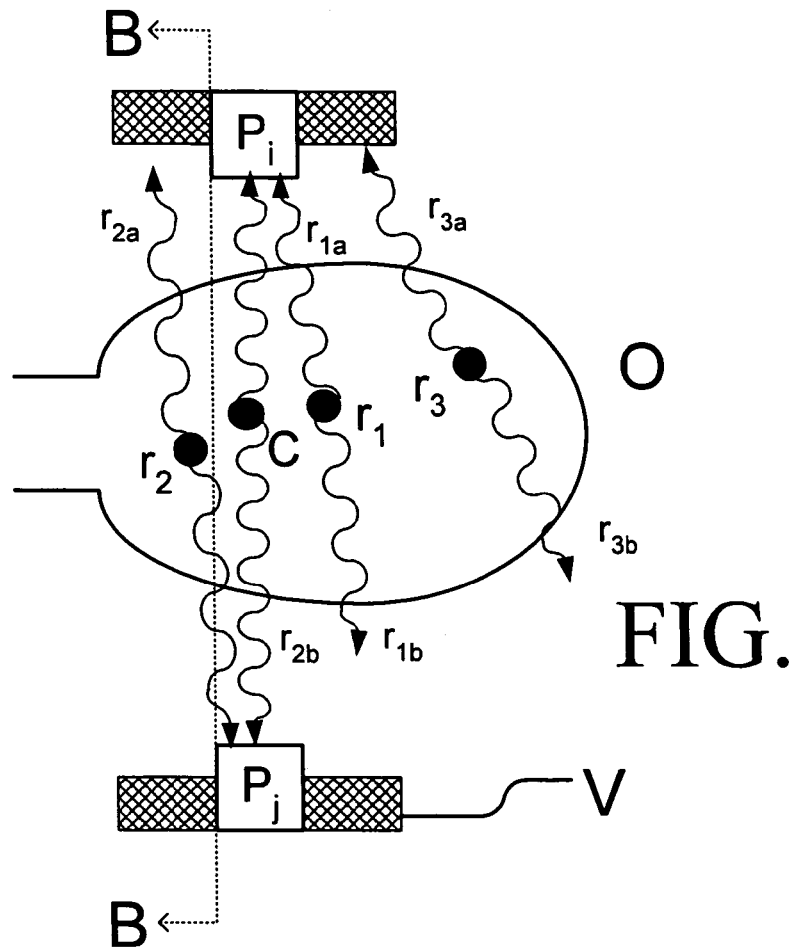
FIGS. 2A-2B illustrate cross-sectional side and end views of an exemplary PET system augmented with a veto detector array V surrounding the primary tomograph ring.
Figure 2B:
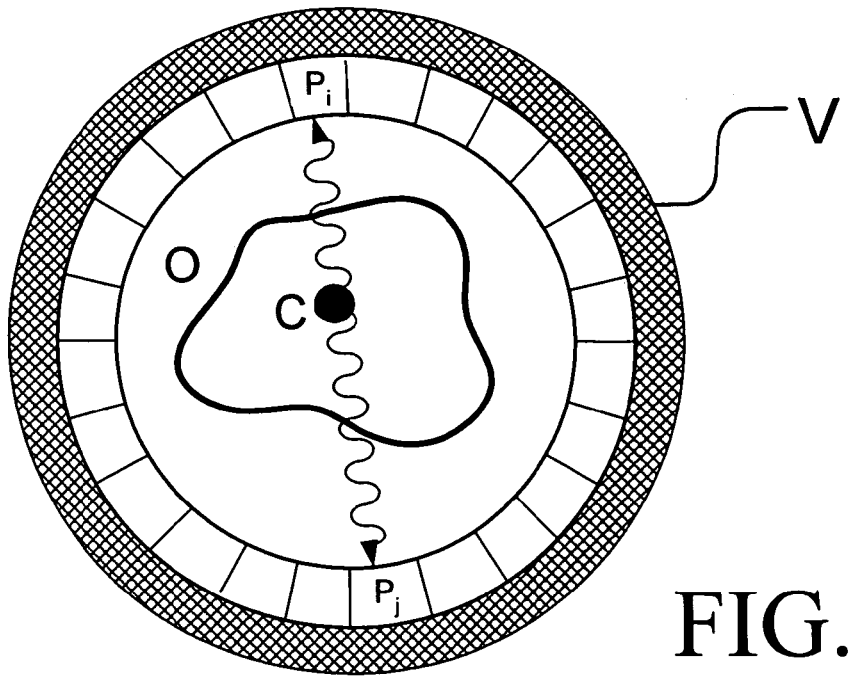

As illustrated in FIGS. 2A and 2B, an exemplary embodiment of a detector according to the invention provides the primary tomography ring with an adjacent "photon veto" detector assembly V, that can be used for improving the detection, identification and exclusion of random events from the primary detector data. The photon veto detectors may be constructed from, for example, inorganic crystals like NaI or $Gd_2SiO_5$ (BGO) or any other photon detector having sufficient sensitivity and arranged to surround, substantially completely, both the primary tomograph ring and the patient or object under investigation.

FIGS. 2A-2B and 3A-3B illustrate exemplary embodiments of PET spectrometers in which the primary tomography detector P array is augmented by an assembly or array of additional photon veto detectors V adjacent and/or surrounding the spectrometer so that a portion of or, in other embodiments, substantially all of the 4π steradians solid angle subtended by the object (or patient) being scanned is covered by either P and/or V detectors.

Figure 3A:
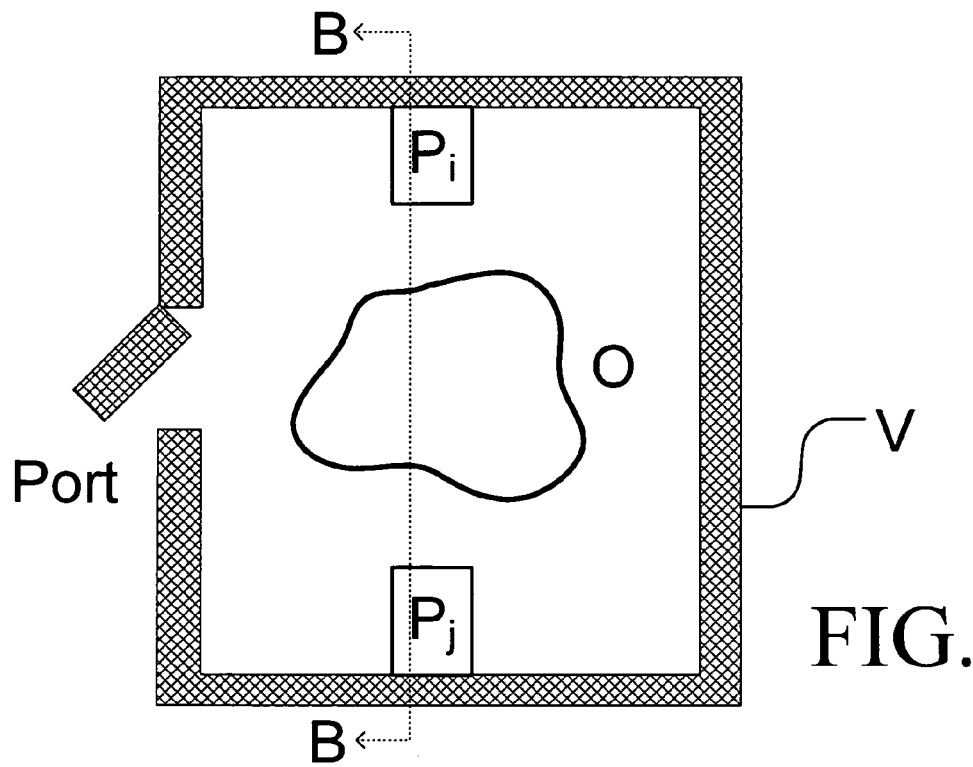
FIGS. 3A-3B illustrate cross-sectional side and end views of another exemplary PET system augmented by a substantially full coverage veto detector array V that detects extra gamma rays produced in randoms events which escape detection by the primary tomograph ring.
Figure 3B:
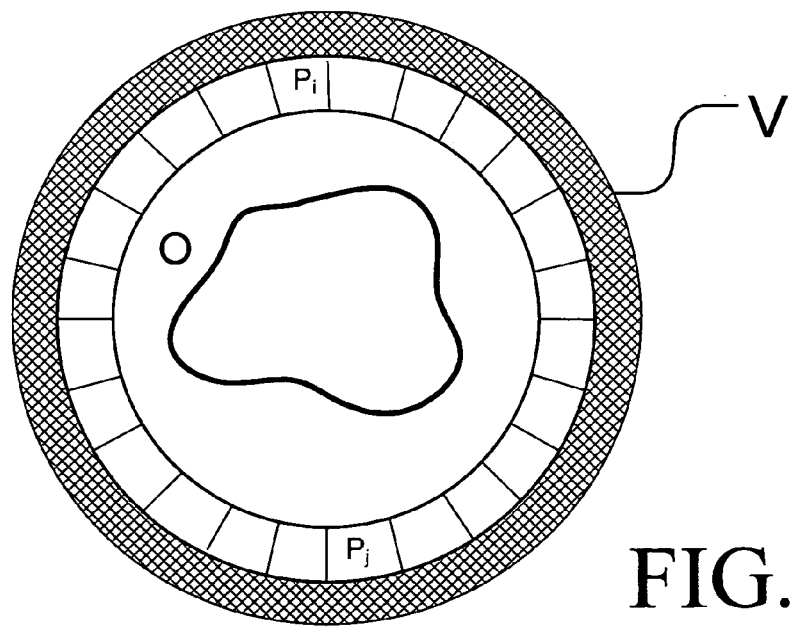

FIGS. 2A-2B, for example, illustrate an exemplary whole body PET system, which includes an opening through which an elongate object (such as a patient) can be moved during the scan. FIGS. 3A-3B illustrate an exemplary micro-PET arrangement in which substantially the full solid angle is be covered by the PET and veto detector arrays.

As will be appreciated, in the exemplary embodiments illustrated in FIGS. 2A-2B and 3A-3B, the veto detector array preferably provides sufficient angular coverage so that a number of photons that escape detection in the primary tomography ring detectors P would be detected and registered in one of the veto detectors provided in the detector array V. As illustrated in FIG. 3A, the detector array V may be provided with an access port P through which the scanned matter may be introduced.

Figure 4A:
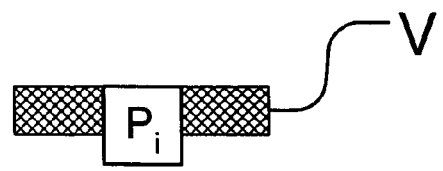
FIGS. 4A-4E illustrate cross-sectional side views of a portion of other exemplary configurations of a primary detector, $P_i$, and associated veto detectors V.
Figure 4B:
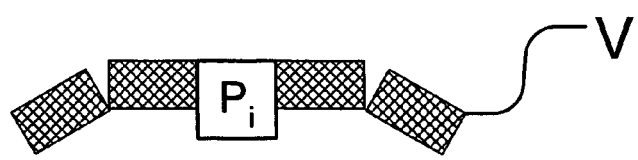
Figure 4C:
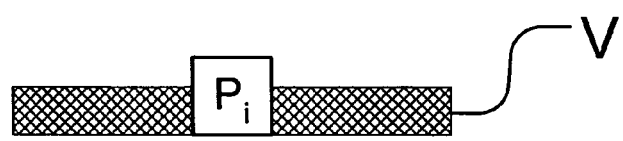
Figure 4D:
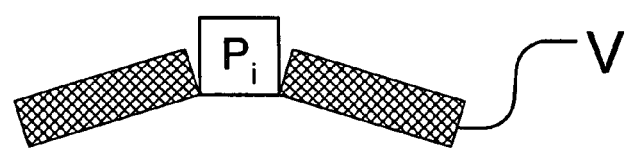
Figure 4E:
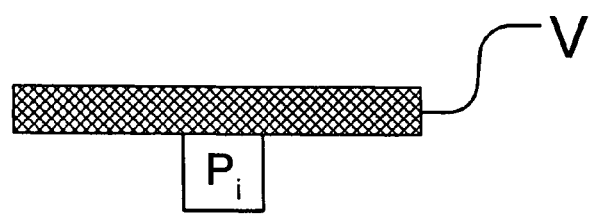

As illustrated in FIGS. 4A-4E, a primary detector, $P_i$, and one or more associated veto detectors, V, may be provided in various configurations. For example, the forward surfaces of the veto detectors may be recessed relative to the primary detector, FIGS. 4A, 4B and 4E, or may be at least partially coplanar, FIGS. 4C and 4D. Similarly, the forward surfaces of the veto detectors may be aligned substantially parallel to the primary detector, FIGS. 4A, 4C and 4E, or may include one or more regions arranged at an acute angle to the primary detector, FIGS. 4B and 4D. The veto detectors may cover a complementary portion of the 4π steradians solid angle to that covered by the primary detector, FIGS. 4A-D, or may provide overlapping coverage as illustrated in FIG. 4E.

The veto detector array V may be constructed from one or more types of photon detectors that have, or may be configured to have, a degree of timing resolution necessary to detect photons produced by random events that occur within an appropriate coincidence window. Detectors suitable for use in the veto detector array include, for example, segmented crystals with individual photo-detectors, large single crystals, combinations of plastic scintillator and lead detectors, liquid xenon, and any other type of photon detector that exhibit sufficient sensitivity and timing resolution.

An electronic logic system is coupled to both the primary tomograph ring and the veto detector assembly for improving the ability of the imaging system to distinguish between True event photons, and accept the corresponding position data for inclusion in the accumulating image data, and pairs of random event photons that strike the primary tomograph ring within the coincidence period, which are preferably excluded from the image data. Accepted events (normally True and scattered events) are designated as those events that exhibit a coincidence of photons detected by valid P detector elements that is NOT accompanied by any veto V detector signal, i.e., $P_i \cdot P_j \cdot \overline{V}$, where $\overline{V}$ represents the requirement that no veto detector signal occurred within the defined coincidence time window. Normally, each valid signal will also be required to exceed some effective energy threshold.

Figure 5:
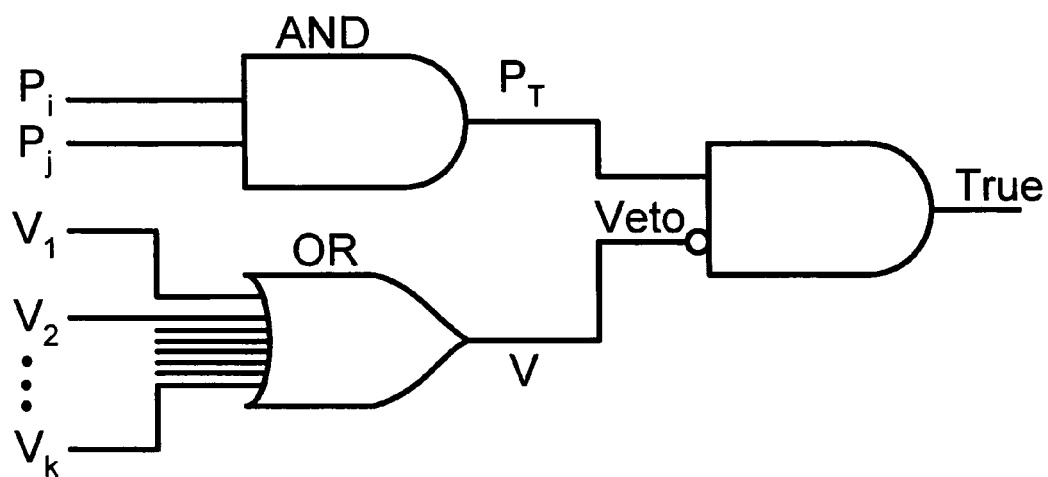
FIG. 5 illustrates an exemplary logic system that may be used for vetoing random events in which a detected coincidence $P_i \cdot P_j$ is vetoed (or canceled) by the detection of a veto signal from the veto array V within the coincidence time window.

An example of an electronic logic system to accomplish the veto function is shown schematically in FIG. 5. The detection data from generally opposed pairs of primary detectors, $P_i$ and $P_j$, will be input into an AND gate whereby detection of a pair of photons having sufficient energy and arriving at the paired detectors within a specified coincidence time period will generate a preliminary "TRUE" result, $P_T$. Substantially simultaneously, the detection data from a plurality of veto detectors, $V_i$-$V_k$, will be feed to an OR gate, whereby detection of a photon by one of the veto detectors will indicate that the preliminary true result, $P_T$, may have been the result of a pair of randoms events. The output of the AND gate will be combined with the inverse of the output of the OR gate thereby allowing the transmission of primary detector data only in those instances in which there is increased confidence that the primary detector pair has detected the result of a single positron annihilation event.

High rate photon detection systems using crystals and other types of detectors, like the one described above, are commonly known to work as described. High efficiency is obtained by using detectors which are thick enough to absorb and detect nearly all photons hitting them and by covering at least most possible directions for the emitted photons. For instance, in particle physics experiments, including those relating to the E787 Collaboration at Brookhaven National Laboratory, a photon veto system was used to eliminate events having background photons during the measurement of rare K meson decays. This photon veto system is described in more detail by Adler in *Further Evidence for the Decay $K^+ \rightarrow \pi^+ \nu \overline{\nu}$*, Physical Review Letters, Vol. 88, No. 4 (2002), the disclosure of which is incorporated herein, in its entirety, by reference.

In particle physics applications, photon detection efficiency is eventually limited by physical processes such as photonuclear interactions. However, for the applications described above, the inefficiencies associated with these sources are generally at levels lower than the inefficiencies associated with other limitations such as the geometry of the scanned mass and the potential for and uniformity of the absorption of photons within the scanned mass.

The invention described above includes both an apparatus and a method for suppressing random event data for improving the quality of the image data and the resulting images that can be obtained on medical or industrial imaging scanners such as PET tomographs which measurement of coincident radiation to accumulate image data. It is believed that the method and apparatus described would also be useful for the reduction of random coincidences for cases where the primary or True signal is not a coincidence measurement but is characterized by some other property, such as the energy of an X-ray, in which background events are accompanied by other radiation emitted in coincidence.

What is claimed is:

1. A method for determining the position of a positron annihilation event within scanned matter comprising:
   detecting a first gamma ray at a first primary detector;
   detecting a second gamma ray at a second primary detector;
   wherein the first and second primary detectors are a valid primary detector pair and the first and second gamma rays are detected within a coincidence time period;
   evaluating random gamma ray detection by a veto detector array within the coincidence time period;
   forwarding data from the primary detectors to an image memory when the veto detector array detects no random gamma ray during the coincidence period.

2. The method for determining the position of a positron annihilation event within scanned matter according to claim 1, wherein:

the first and second gamma rays must exceed a base energy level to be detected by the first and second primary detectors.

3. The method for determining the position of a positron annihilation event within scanned matter according to claim 1, wherein:
the first and second gamma rays must have an energy within a valid energy range in order to be detected by the first and second primary detectors.

4. The method for determining the position of a positron annihilation event within scanned matter according to claim 3, wherein:
the random gamma ray must exceed a base energy level to be detected by the veto detector array.

5. The method for determining the position of a positron annihilation event within scanned matter according to claim 1, wherein:
the steps of detecting, evaluating and forwarding are repeated to accumulate a plurality of image data points within the image memory.

6. The method for determining the position of a positron annihilation event within scanned matter according to claim 5, wherein:
the plurality of image data points within the image memory are used to reconstruct an image of the scanned matter.

7. The method for determining the position of a positron annihilation event within scanned matter according to claim 5, wherein:
a majority of the gamma rays originating within the scanned matter strike either the primary detectors or the veto detector array.

8. A method for determining the position of a plurality of positron annihilation events within scanned matter comprising:
arranging the scanned matter within a primary detector array;
arranging a veto detector array adjacent the primary detector array;
detecting a plurality of coincident gamma ray pairs at a plurality of valid primary detector pairs;
evaluating random gamma ray detection by the veto detector array during coincident time periods corresponding to the coincident gamma ray pairs; and
transferring data corresponding to coincident gamma ray pairs detected during coincident time periods during which no random gamma ray was detected by the veto detector array.

9. The method for determining the position of a plurality of positron annihilation events within scanned matter according to claim 8, further comprising:
calculating location data corresponding to a plurality of single point sources capable of having produced the transferred data corresponding to coincident gamma ray pairs.

10. The method for determining the position of a plurality of positron annihilation events within scanned matter according to claim 9, further comprising:
accumulating the location data corresponding to the plurality of single point sources within an image memory;
using the location data within the image memory to reconstruct an image of the scanned matter.

11. An apparatus for determining the position of a plurality of positron annihilation events within scanned matter comprising:
an open area for receiving at least a portion of the scanned matter, wherein a plurality of gamma ray pairs are generated within the scanned matter as a result of positron annihilation events;
a primary detector array arranged at least partially around the open area for detecting a first portion of the plurality of coincident gamma ray pairs, the first portion including both true pairs and false pairs resulting from a pair of randoms events;
a veto detector array arranged adjacent the primary detector array and the open area for detecting a second portion of the plurality of gamma ray pairs, wherein the second portion includes primarily gamma rays corresponding to the pair of randoms events; and
a discriminator logic circuit for transferring detection data from the primary detector array corresponding to coincident gamma ray pairs detected during coincident time periods during which no gamma rays were detected by the veto detector array.

12. The apparatus for determining the position of a plurality of positron annihilation events within scanned matter according to claim 11, further comprising:
a first processor for converting the transferred detection data into location data corresponding to a calculated source location for each pair of coincident gamma ray pairs; and
a memory for accumulating the location data generated by the processor.

13. The apparatus for determining the position of a plurality of positron annihilation events within scanned matter according to claim 12, further comprising:
a second processor for processing the accumulated location data to reconstruct an image of the scanned matter;
a display for illustrating the reconstructed image of the scanned matter.

14. The apparatus for determining the position of a plurality of positron annihilation events within scanned matter according to claim 11, wherein:
the primary detector array includes a plurality of detectors arranged in a ring configuration surrounding the open area; and
the veto detector array includes a plurality of detectors arranged to encompass, substantially completely, both the primary detector array and the open area.

15. The apparatus for determining the position of a plurality of positron annihilation events within scanned matter according to claim 14, wherein:
the combination of the veto detector array and the primary detector array define a composite detector array that provides substantially complete 4π steradians solid angle coverage extending from the open area, and further wherein, an access port may be opened through a portion of the composite detector array for placing the scanned matter within the open area and removing the scanned matter from the open area.

16. The apparatus for determining the position of a plurality of positron annihilation events within scanned matter according to claim 15, wherein:
the primary detector array covers a first solid angle portion of the 4π steradians solid angle coverage; and
the veto detector array covers a second solid angle portion of the complete 4π steradians solid angle coverage.

17. The apparatus for determining the position of a plurality of positron annihilation events within scanned matter according to claim 16, wherein:
there is no overlap between the first solid angle portion and the second solid angle portion of the 4π steradians solid angle coverage.

18. The apparatus for determining the position of a plurality of positron annihilation events within scanned matter according to claim 16, wherein:
there is substantially complete overlap of the first solid angle portion by the second solid angle portion of the $4\pi$ steradians solid angle coverage.

19. The apparatus for determining the position of a plurality of positron annihilation events within scanned matter according to claim 14, wherein:
the combination of the veto detector array and the primary detector array define a composite detector array that provides less than $4\pi$ steradians solid angle coverage extending from the open area.

20. An apparatus for determining the position of a plurality of positron annihilation events within scanned matter comprising:
an open area for receiving at least a portion of the scanned matter, wherein a plurality of gamma ray pairs are generated within the scanned matter as a result of positron annihilation events;
a primary detector array is arranged in a ring configuration surrounding the open area for detecting a first portion of the plurality of coincident gamma ray pairs, the first portion including both true pairs and false pairs resulting from a pair of randoms events;
a veto detector array including a plurality of detectors arranged to encompass, substantially completely, both the primary detector array and the open area for detecting a second portion of the plurality of gamma ray pairs, wherein the second portion includes primarily gamma rays corresponding to the pair of randoms events; and
a discriminator logic circuit for transferring detection data from the primary detector array corresponding to coincident gamma ray pairs detected during coincident time periods during which no gamma rays were detected by the veto detector array.

* * * * *